United States Patent [19]
Pinchot

[11] 3,823,658
[45] July 16, 1974

[54] TOASTER-BROILER STACKING UNIT
[76] Inventor: Louis Pinchot, 8101 Southwest 72nd, Miami, Fla. 33143
[22] Filed: Oct. 13, 1972
[21] Appl. No.: 297,386

[52] U.S. Cl.............................. 99/340, 219/454
[51] Int. Cl. .......................................... A47j 37/08
[58] Field of Search ...... 99/339, 340; 219/393, 394, 219/395, 396, 454, 472, 474, 479

[56] References Cited
UNITED STATES PATENTS

| | | | |
|---|---|---|---|
| 1,263,359 | 4/1918 | Armstrong | 99/339 |
| 1,669,318 | 5/1928 | Baad | 99/337 |
| 1,817,118 | 8/1931 | Adami | 219/476 |
| 2,358,996 | 9/1944 | Platkin | 99/339 |
| 2,634,749 | 4/1953 | Cone | 99/337 X |
| 2,862,441 | 12/1958 | Schmall | 99/401 X |
| 3,262,382 | 7/1966 | Williams | 99/339 |
| 3,333,530 | 8/1967 | Reuther | 99/339 |
| 3,669,004 | 6/1972 | Eaton et al. | 99/339 X |

Primary Examiner—Billy J. Wilhite
Attorney, Agent, or Firm—LeBlanc & Shur

[57] ABSTRACT

The unit includes a toaster adapted for releasable superposition over a broiler. A stacking frame is secured to and supports the broiler when used separately and the toaster-broiler unit when stacked. The frame is secured at the opposite ends of the broiler and, at each end, includes a lower base and an upper track having an inwardly extending tongue. The opposite ends of the toaster are grooved to receive the tongues upon lateral registration of the tongues and grooves. Each track is provided with a locking device for releasably securing the toaster to the broiler when stacked thereover. To remove the toaster from the broiler for separate use of one or both of the toaster and broiler, each upper track is provided with a push button. Upon depression of the button, the locking device is released permitting the toaster to slide laterally from the frame and from its stacked position over the broiler.

12 Claims, 5 Drawing Figures

PATENTED JUL 16 1974  3,823,658
FIG. 1
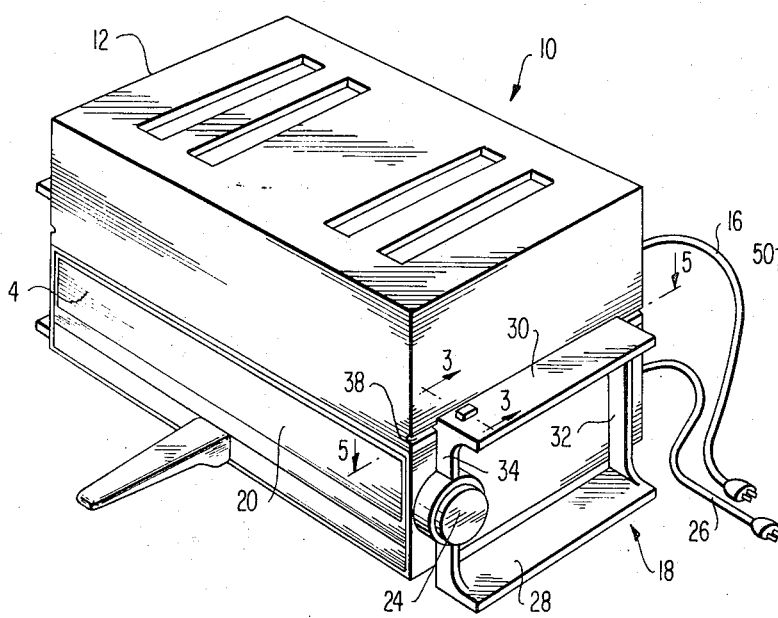
FIG. 3
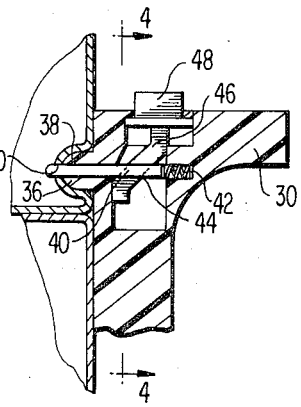
FIG. 4
FIG. 2
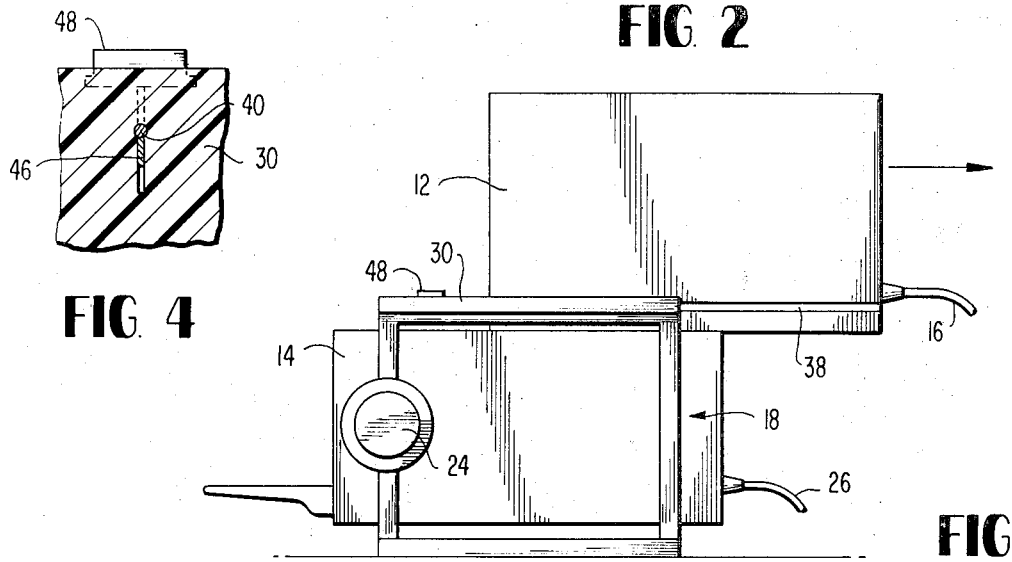
FIG. 5
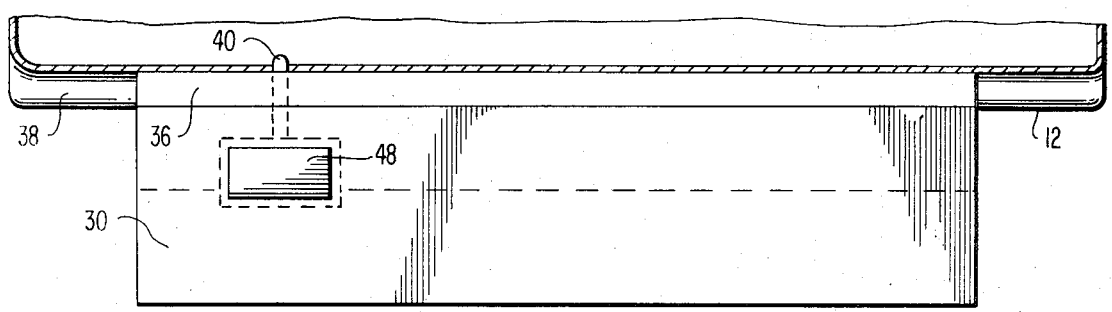

TOASTER-BROILER STACKING UNIT

The present invention relates to cooking appliances and particularly relates to a combination toaster-broiler unit including apparatus for stacking the toaster over the broiler.

Toasters and broilers are usually provided as separate, self-contained discrete appliances. However, it is oftentimes desirable to provide such appliances in a more compact unit. That is, in those dwellings having very limited kitchen and dinette space, it is desirable to provide a unit comprised of both a toaster and a broiler but which unit occupies considerably less area than the combined areas of the two separate appliances. Ideally, such combined toaster-boiler unit should occupy substantially the same plan area as occupied by one of the toaster or broiler individually. One proposal for combining a toaster and broiler is described and illustrated in U.S. Pat. No. 2,862,441. This patent discloses a toaster permanently mounted on the upper surface of a broiler with the heating element for such appliance serving both the toaster and broiler. The appliance disclosed in that patent is thus a totally new appliance wherein the toaster and broiler are incapable of separate use apart from one another. That is, it is desirable to retain the attributes of each of a toaster and a broiler whereby they can be used separately and at different locations when desired, while providing a capability for their combination in a unit occupying substantially a like area as either the toaster or broiler. Thus in those areas having limited kitchen or dinette space, the toaster would normally be used in a stacked position over the broiler while in those areas where space is not a problem these appliances could be used separately or stacked as desired. Further, it is desirable that conventional broiler and toaster appliances can be readily and easily adapted for combination as a stacked unit with minimum modification.

The present invention provides a toaster-broiler stacking unit which minimizes or eliminates the foregoing and other problems and disadvantages associated with prior combined appliances of this type and provides a novel and improved toaster-broiler stacking unit having various advantages in construction, mode of operation, and use in comparison therewith.

A princial feature of the present invention resides in the limited plan area required for the toaster-broiler combination, as well as its ready convertibility between use as stacked appliances or for use as discrete self-contained appliances as desired. To this and other ends, the present invention provides a broiler having a frame at its opposite ends including a base depending below the broiler for supporting the broiler when used separately and for supporting the combined toaster-broiler unit when the toaster and broiler are stacked. The frames also extend above the top surface of the broiler. The toaster has substantially the same plan area as the broiler and is provided with an elongated groove along each of its opposite ends at an elevation above its lower surface. An inwardly extending elongated tongue is provided on each of the frame parts which extend above the broiler. Thus the toaster can be disposed such that the grooves laterally register with the tongues and then displaced laterally into a position in vertical registry over the broiler. The engagement of the tongues in the grooves prevents removal of the toaster from the broiler. To preclude lateral displacement of the toaster relative to the broiler, a locking device is carried by each frame and includes a spring biased pin movable between a position engaging the toaster and a position spaced therefrom. Particularly a push button is provided on the frame for retracting the pin from a locking position engaging in an opening formed on the toaster. Thus, the button is depressed when the toaster is laterally displaced along the tongues carried by the frames toward its final position and released for engagement with the toaster in its final position.

It will be appreciated that the toaster and broiler are each self-contained appliances having separate heating elements and electrical connections whereby they can be used separately at different locations.

Accordingly, it is a primary object of the present invention to provide a novel and improved toaster-broiler stacking unit.

It is another object of the present invention to provide a novel and improved toaster-broiler stacking unit which occupies substantially no more plan area than a single appliance of like type.

It is still another object of the present invention to provide a toaster-broiler stacking unit wherein the toaster and broiler and readily releasably secured one to the other for use in stacked relation or for separate use.

It is a still further object of the present invention to provide a novel and improved broiler-toaster stacking unit wherein existing and currently manufactured appliances can be readily adapted at low cost for use as part of the broiler-toaster stacking unit hereof.

These and further objects and advantages of the present invention will become more apparent upon reference to the following specification, appended claims and drawings wherein:

FIG. 1 is a perspective view of a toaster-broiler stacking unit constructed in accordance with the present invention;

FIG. 2 is a side elevational view of the toaster-broiler stacking unit with the toaster illustrated in an intermediate position during removal thereof from the broiler;

FIG. 3 is an enlarged fragmentary cross-sectional view thereof taken generally about line 3—3 in FIG. 1;

FIG. 4 is an enlarged fragmentary cross-sectional view thereof taken generally about line 4—4 in FIG. 3; and FIG. 5 is an enlarged fragmentary cross-sectional view thereof taken generally about line 5—5 in FIG. 1.

Referring now to the drawings, particularly to FIG. 1 therein, there is illustrated a toaster-broiler stacking unit generally indicated 10 and including a toaster 12 and a broiler 14. The toaster, illustrated at 12, has its own heating element, not shown, and an electrical connection indicated 16, toaster 12 being conventional except as it is adapted for stacking with broiler 14. The illustrated toaster is commonly referred to as a double-toaster unit. It will be appreciated that a single unit could be utilized in the toaster-broiler stacking unit hereof. Broiler 14 except for the end frame assemblies generally indicated 18, constitutes a conventional broiler having a door 20 and a handle 22 whereby access to the broiler and pan carried thereby is provided. A conventional thermostatic control 24 is illustrated at the side of broiler 14. Broiler 14, like toaster 12, has its own self-contained heating unit, not shown, and electrical connection 26. Accordingly, it will be appreciated that the toaster 12 and broiler 14 can be used separately and apart from one another for use at different locations as desired.

In order to provide a combination toaster-broiler unit having a plan area substantially reduced in comparison with the combined plan area of the toaster and broiler whereby the same can be located in small areas, for example, kitchens or dinettes having limited space, broiler 14 is provided at its opposite ends with support frame assemblies 18. Assemblies 18 each includes a frame permanently secured by suitable means not shown, for example screws, to the opposite ends of broiler 14 and comprising a lower transversely extending base 28 and a similar upper support bar 30 joined one with the other by an end leg 32 and, at the opposite end, by projections 34 which straddle thermostatic control 24.

Base 28 and support bar 30 extend below and above the lower and upper extremities respectively of the broiler. Thus, support frames 18 support both the broiler when used separately and the toaster-broiler combination when stacked together as illustrated. Also, note that the bars 30 provide convenient handles for lifting the broiler or combination broiler-toaster. For reasons which will be appreciated from the ensuing description, supports bars 30 are provided tongues 36 which project from the inner faces of and are coextensive in transverse dimension with bars 30.

The opposite ends of toaster 12 are each provided with a transversely extending groove or recess 38 coextensive with the width of the toaster for receiving the inwardly projecting tongues 38 carried on the inside faces of the support bars 30. Since the toaster 12 and broiler 14 are generally coextensive one with the other in both transverse and longitudinal dimensions, it will be appreciated that toaster 12 can be located such that grooves 38 lie in transverse registry with tongues 36 and thereafter laterally displaced into the illustrated position in vertical registry with broiler 14.

To releasably lock toaster 12 in vertical registry over broiler 14, there is provided, preferably at each end of the unit 10, a locking device comprised of a pin 40 slidably carried by support bar 30. Pin 40 is biased by a spring 42 for movement in a direction toward the opposite frame 18 and for movement through the tongue 36. Pin 40 has a central slot 44 in which is received a generally vertically extending camming pin 46. Pin 46 depends from a button 48 exposed through the upper surface of frame bar 30. It will thus be appreciated that depression of button 48 causes camming pin 46 to displace pin 40 toward the right as illustrated in FIG. 3 against the bias of spring 42. The toaster is provided with an opening 50 within groove 36 for receiving the tip of pin 40 when the pin and opening are aligned one with the other. Consequently, when the toaster is in vertical registry over broiler 14 with the tongues 36 in grooves 38, release of button 48 permits spring 42 to displace pin 40 to the left as illustrated in FIG. 3 and thereby engage in opening 50. This locks the toaster in the position illustrated in FIG. 1. To release the toaster, button 48 is depressed causing pin 40 to be withdrawn from opening 50 against the bias of spring 42 whereby toaster 12 can be displaced laterally from between end frame assemblies 18 as illustrated in FIG. 2.

It will be appreciated from the foregoing that the objects of the invention are fully accomplished in that there is provided a toaster-broiler stacking unit whereby the appliances are readily and easily brought into superposition one over the other and released from that position for use as separate discrete appliances. In such superposition, it will be noted that the area occupied by the combined unit corresponds to the area occupied by one of the units whereby optimum utilization of space available is achieved, particularly in those living areas such as kitchens and dinettes where only limited space is available. It is also noted that the foregoing may be provided through ready adaptation of existing appliances.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A stacking unit for appliances comprising: first and second appliances, each having a discrete electrical connection whereby said appliances are capable of individual utilization, a frame secured to said first appliance, means for releasably locking said second appliance to said frame in vertical registry over said first appliance, said securing means including first and second guides carried by said frame and by said second appliance, respectively, said first guide being carried by said frame in a location spaced above said first appliance, said second guide being carried by said second appliance at a location above the bottom thereof, said first and second guides being cooperable one with the other to provide for sliding movement of said second appliance relative to said first appliance in a horizontal direction when said second appliance is being secured to said frame.

2. Apparatus according to claim 1, wherein said first and second guides comprise a tongue and a groove respectively, and means for releasably locking said first and second appliances one to the other including a pin movable between a position locking said frame and said second appliance one to the other and a position releasing said frame and second appliance for relative sliding movement, means for biasing said pin for movement into said locking position, and means for moving said pin from said locking position to said release position.

3. Apparatus according to claim 1, wherein said frame includes a pair of support bars carried by said first appliance at opposite ends thereof, said bars having tongues extending toward one another, said second appliance having a groove at opposite ends thereof whereby said appliances are slidable relatively to one another when said tongues engage said grooves.

4. Apparatus according to claim 1, wherein said first appliance includes a broiler and said second appliance includes a toaster, each of said broiler and said toaster having an electrical connection for operation thereof independently of the other.

5. The apparatus according to claim 1 wherein said first appliance comprises a broiler and said second appliance comprises a toaster, each of said broiler and said toaster having an electrical connection for operation thereof independently of one another.

6. The apparatus according to claim 1 wherein said releasable locking means includes a pin movable between a position locking said frame and said second appliance one to the other and a position releasing said frame and said second appliance for relative sliding movement, means for biasing said pin for movement into said locking position, and means for moving said pin from said locking position to said released position.

7. The apparatus according to claim 1 wherein said first appliance comprises a broiler and said second appliance comprises a toaster, each of said broiler and said toaster having an electrical connection for operation thereof independently of one another, said releasable locking means including a pin movable between a position locking said frame and said second appliance one to the other and a position releasing said frame and said second appliance for relative sliding movement, means for biasing said pin for movement into said locking position, and means for moving said pin from said locking position to said released position.

8. A stacking unit for appliances comprising first and second appliances, each having a discrete electrical connection whereby said appliances are capable of individual utilization apart from one another, a frame secured to said first appliance, means for releasably securing said second appliance to said frame with said appliances lying in vertical registry one over the other, said securing means including first and second guides carried by said frame and said second appliance, respectively, said first guide being carried by said frame at a location vertically spaced from said first appliance, said second guide being carried by said second appliance at an elevation intermediate its upper and lower edges, said guides being cooperable one with the other to provide for relative sliding movement of said appliances when said second appliance is secured to said frame, said securing means including locking means carried at least in part by said first guide for preventing relative sliding movement of said applicances when said appliances lie in vertical registration with said second appliance secured to said frame.

9. The apparatus according to claim 8 wherein said first and second guides coopera to provide for relative sliding movement of said appliances in a transverse direction.

10. Apparatus according to claim 9, wherein said first and second guides comprise a tongue and a groove respectively, and said locking means further including a pin movable between a position locking said frame and said second appliance one to the other and a position releasing said frame and second appliance for relative sliding movement, means for biasing said pin for movement into said locking position, and means for moving said pin from said locking position to said release position.

11. Apparatus according to claim 9, wherein said frame includes a pair of support bars carried by said first appliance at opposite ends thereof, said bars having tongues extending toward one another, said second appliance having a groove at opposite ends thereof whereby said appliances are slidable relatively to one another when said tongues engage said grooves.

12. Apparatus according to claim 9, wherein said first appliance includes a broiler and said second appliance includes a toaster, each of said broiler and said toaster having an electrical connection for operation thereof independently of the other.

* * * * *

UNITED STATES PATENT OFFICE
CERTIFICATE OF CORRECTION

Patent No. 3,823,658   Dated July 16, 1974

Inventor(s) LOUIS PINCHOT

It is certified that error appears in the above-identified patent and that said Letters Patent are hereby corrected as shown below:

Col. 2, line 24, "and readily" should read --are readily--.

Col. 3, line 28, "supports" should read --support--.

Col. 6, line 7, Claim 8, "applicances" should read --appliances--.

Col. 6, line 11, Claim 9, "coopera" should read --cooperate--.

Signed and sealed this 5th day of November 1974.

(SEAL)
Attest:

McCOY M. GIBSON JR.
Attesting Officer

C. MARSHALL DANN
Commissioner of Patents